United States Patent [19]

Baghaii

[11] Patent Number: 5,159,003

[45] Date of Patent: Oct. 27, 1992

[54] POLYESTER-COMPATIBLE ALLOYS OF POLYCARBONATE

[75] Inventor: Parviz Baghaii, Independence, Ohio

[73] Assignee: Ferro Corporation, Cleveland, Ohio

[21] Appl. No.: 593,949

[22] Filed: Oct. 9, 1990

[51] Int. Cl.$^5$ .................. C08L 69/00; C08L 67/00; C08K 5/13; C08K 5/37

[52] U.S. Cl. ...................... 524/288; 524/287; 524/303; 524/304; 524/305; 524/349; 524/350; 524/404; 524/407; 524/435; 524/504; 525/64; 525/66; 525/67

[58] Field of Search .............. 525/67, 64, 66; 524/287, 288, 383, 304, 305, 349, 350, 404, 407, 435, 504

[56] References Cited

U.S. PATENT DOCUMENTS

| | | | |
|---|---|---|---|
| 3,218,372 | 11/1965 | Okamura et al. | 525/439 |
| 3,668,274 | 6/1972 | Owens et al. | 525/66 |
| 3,752,866 | 8/1973 | Doerr | 525/439 |
| 3,792,115 | 2/1974 | Kishikawa et al. | 525/439 |
| 3,953,394 | 4/1976 | Fox et al. | 525/439 |
| 3,956,229 | 5/1976 | Bollen et al. | 525/439 |
| 3,975,355 | 8/1976 | Bollen et al. | 525/439 |
| 3,984,497 | 10/1976 | Owens et al. | 525/69 |
| 4,034,013 | 7/1977 | Lane | 525/64 |
| 4,034,016 | 7/1977 | Baron et al. | 525/439 |
| 4,086,300 | 4/1978 | Owens et al. | 525/66 |
| 4,123,473 | 10/1978 | Amin et al. | 426/108 |
| 4,172,859 | 10/1979 | Epstein | 525/174 |
| 4,180,494 | 12/1979 | Formuth et al. | 525/69 |
| 4,217,427 | 8/1980 | Falk et al. | 525/176 |
| 4,267,096 | 5/1981 | Bussink et al. | 525/67 |
| 4,280,949 | 7/1981 | Dieck | 525/67 |
| 4,320,212 | 3/1982 | Liu | 525/148 |
| 4,710,534 | 12/1987 | Liu | 525/67 |
| 4,780,506 | 10/1988 | Wefer | 525/67 |
| 4,904,729 | 2/1990 | Laughner | 525/408 |

FOREIGN PATENT DOCUMENTS

| | | | |
|---|---|---|---|
| 114288 | 8/1984 | European Pat. Off. | 525/67 |

*Primary Examiner*—James J. Seidleck
*Assistant Examiner*—David Buttner
*Attorney, Agent, or Firm*—Hudak & Shunk Co.

[57] ABSTRACT

A compatible alloy of a polyester, such as polyethylene terephthalate (PET), and a polycarbonate containing effective amounts of a polyester compatibilization agent and a polycarbonate compatibilization agent does not show any apparent phase separation according to Transmission Electron Microscopy (TEM) micrographs. The PET compatibilization agent is a multiphase polymer desirably with a flexible polymer core and a functional polymer shell. The polycarbonate compatibilization agent is also a multiphase polymer desirably with a flexible polymer core and a functional polymer shell. Optionally, a polymer can be utilized which is non-compatible with the alloy, such as an immiscible polyester, e.g., polybutylene terephthalate (PBT). In other words, an incompatible polyester can be utilized along with a compatible alloy polyester.

The alloy is thermoplastic and can contain various fillers as well as various reinforcing fibers such as fiberglass. The alloy has unexpectedly improved properties such as very high notched Izod impact strength, high heat deflection, and the like, and thus is readily processible and has utility as for exterior body panels for automobiles and the like.

33 Claims, No Drawings

POLYESTER-COMPATIBLE ALLOYS OF POLYCARBONATE

FIELD OF THE INVENTION

The present invention relates to thermoplastic, compatible alloys of polyester, such as polyethylene terephthalate (PET), and polycarbonate with effective amounts of compatibilization agents therein.

BACKGROUND

Heretofore, PET and polycarbonates have not been compatible and any blends thereof have contained very small amounts, i.e., less than 10 percent by weight, of one component.

U.S. Pat. No. 4,034,016, to Baron et al., relates to ternary polyblends consisting essentially of polybutylene terephthalates, polyurethanes, and aromatic polycarbonates in carefully delineated ranges so that they exhibit solvent stress cracking resistance.

U.S. Pat. No. 4,180,494, to Fromuth et al., relates to a high impact and solvent resistant composition comprising (a) about 25 to 95 percent by weight of an aromatic polymer, (b) about 1 to 8 percent by weight of an aromatic polycarbonate, and (c) and balance to make 100 percent of a core-shell polymer having a butadiene-based core. Preferably the composition also includes about 1 to 150 parts by weight of glass fiber reinforcement per 100 parts of (a), (b), and (c).

U.S. Pat. No. 4,280,949, to Dieck, relates to a modified thermoplastic polyester composition comprising (a) polybutylene terephthalate, (b) a modifier comprising a combination of an acrylic or methacrylic monomer grafted polymer of a conjugated diene alone or combined with a vinyl aromatic and an aromatic polycarbonate, (c) a mineral filler such as clay, mica, talc, alone or combined with glass fibers, and optionally (d) a flame retardant.

U.S. Pat. No. 4,320,212, to Liu, relates to ternary compositions which comprise a mixture of a high molecular weight thermoplastic, an aromatic polycarbonate, an acrylate copolymer, and a thermoplastic polyester.

U.S. Pat. No. 4,780,506, to Wefer, relates to high impact strength blends based on polyethylene terephthalate resin, aromatic polycarbonate resin and EPDM grated styrene-acrylonitrile copolymers.

U.S. Pat. No. 3,218,372, to Okamura et al., relates to a molding material comprising substantially 95 percent to 5 percent by weight of a polycarbonate derived from 4,4'-dihydroxy-di(mononuclear aryl)alkylene and 5 percent to 95 percent by weight of polyalkylene terephthalate, and the molded articles obtained therefrom.

U.S. Pat. No. 3,752,866, to Doerr, relates to a process for the late addition of a polycarbonate to a fiber-forming polyester melt which results in a polyester having a lower level of carboxyl end groups. The improved polyester of this invention exhibits utility in reinforced rubber articles such as industrial belts and pneumatic tire structures.

U.S. Pat. No. 3,792,115, to Kishikawa et al., relates to a thermoplastic resin composition of polycarbonate improved in impact strength and heat deformation resistance which comprises 1 percent to 99 percent by weight of polycarbonate resin and 99 percent to 1 percent by weight of polyarylene ester on the basis of the total weight of the composition.

U.S. Pat. No. 3,956,229, to Bollen et al., relates to a film or sheet capable of being thermoformed into a shaped article and being formed from a blend of about 60 to 85 parts by weight of a polyethylene terephthalate polymer having an intrinsic viscosity of at least about 0.90 and correspondingly about 40 to 15 parts by weight of a polycarbonate polymer, the polyethylene terephthalate portion of the film or sheet having a degree of crystallinity in the range of about 20 percent to 40 percent. The film is essentially nonoriented.

U.S. Pat. No. 3,975,355, to Bollen et al., relates to a film or sheet capable of being thermoformed into a shaped article and being formed from a blend of about 60 to 85 parts by weight of a polyethylene terephthalate having an intrinsic viscosity of at least about 0.90, about 15 to 40 parts by weight of a polycarbonate and about 15 to 20 parts by weight of a nonacidic silica filler, such as novaculite, the polyethylene terephthalate portion of the film or sheet having a degree of crystallinity in the range of about 20 percent to 40 percent.

U.S. Pat. No. 4,123,473, to Amin et al., relates to a sheet formed from a uniform blend of from about 80 to 97 percent by weight of polyethylene terephthalate having an intrinsic viscosity of above about 0.9 and a melt viscosity at 525° F. of above about 10,000 poises and correspondingly from about 20 to 3 percent by weight of a polycarbonate resin having an intrinsic viscosity of about 0.4 to 0.6 and a melt viscosity at 500° F. of less than 50,000 poises; said sheet having a haze value as determined by ASTM-D-1003 of less than about 2 percent and being essentially amorphous and nonoriented.

U.S. Pat. No. 3,953,394, to Fox et al., relates to thermoplastic, stable, blended compositions comprising a combination of (a) a poly(ethylene terephthalate) resin and (b) a poly(1,4-butylene terephthalate) resin. The alloyed combination of resins can be reinforced with fillers and also rendered flame retardant.

U.S. Pat. No. 4,172,859, to Epstein, relates to a toughened multiphase thermoplastic composition consisting essentially of one phase containing 60 to 99 percent by weight of a polyester including polycarbonate matrix resin of inherent viscosity of at least 0.35 deciliter/gram, and 1 to 40 percent by weight of at least one other phase containing particles of at least one random copolymer having a particle size in the range of 0.01 to 3.0 microns and being adhered to the polyester, the at least one random copolymer having a tensile modulus in the range of 1.0 to 20,000 psi, the ratio of the tensile modulus of the polyester matrix resin to tensile modulus of said at least one polymer being greater than 10 to 1. The polymer is either a branched or straight chain polymer.

U.S. Pat. No. 4,217,427 to Falk et al., relates to compositions comprising from 70 percent to 95 weight percent polybutylene terephthalate modified by copolymerizing therewith from 30 to 5 weight percent of a diol-terminated polystyrene as pendant chains exhibit marked increase in heat deflection temperature at 264 psi stress, together with an increase in melt flowability.

U.S. Pat. No. 4,267,096, to Bussink et al., relates to compositions comprising (a) a selectively hydrogenated elastomeric block copolymer, (b) a polycarbonate and (c) an amorphous polyester. The use of the combination of (a) and (c) provides improvements in the melt flow characteristics, in resistance to brittle failure, and in the resistance to environmental stress crazing and cracking of the polycarbonate resin component (b).

SUMMARY OF THE INVENTION

The present invention relates to compatible alloys of polyester and polycarbonate containing small but effective amounts of a polyester compatibilization agent as well as a polycarbonate compatibilization agent. Transmission Electron Microscopy (TEM) micrographs of the alloy do not show any apparent phase separation. The amount of the polyester can generally range from about 10 parts to about 90 parts by weight and the amount of the polycarbonate generally ranges from about 90 parts to about 10 parts by weight. Optionally, up to 55 parts by weight of a non-compatible aloy polyester such as polybutylene terephthalate (PBT) can be utilized based upon a total of 100 parts by weight of the compatible polyester and the polycarbonate. The PBT is immiscible in the alloy. The polyester/polycarbonate alloys have excellent impact resistance, high heat deflection temperatures, and stable phase morphologies.

DETAILED DESCRIPTION OF THE INVENTION

Compatible alloys of polyesters and polycarbonates are made by heating the polyester and polycarbonate in the presence of a polyester compatibilization agent and a polycarbonate compatibilization agent to a temperature generally at or desirably above the melting point of the polyester, and mixing under moderate to high shear. Optionally, an immiscible or incompatible polymer such as PBT can be utilized in the alloy, but the same forms an immiscible phase therewith.

Generally, any polyester can be utilized such as those known to the art and to the literature with the exception of a non-compatible alloy polyester such as PBT. Suitable polyesters for the invention are derived from a dicarboxylic acid, preferably an aromatic dicarboxylic acid, and a diol component, and are characterized in that their intrinsic viscosity is at least 0.4 and preferably at least 0.6 deciliters per gram measured in a 1 percent solution of phenol and tetrachloroethane (60/40) at 25° C. The polyesters are generally made from dicarboxylic acids having from about 2 to 15 carbon atoms and preferably from about 6 to 10 carbon atoms. More than one dicarboxylic acid can be utilized to produce a copolymer. Desirably, aromatic dicarboxylic acids are preferred and an aromatic component accounts for at least 85 mole percent of the total dicarboxylic acid component when two or more dicarboxylic acid monomers are utilized. Suitable aromatic dicarboxylic acids include terephthalic acid, isophthalic acid, naphthalene dicarboxylic acid, diphenylsulfone dicarboxylic acid, diphenoxyethane dicarboxylic acid, or combination thereof. The non-aromatic dicarboxylic acids include hydroxy-carboxylic acids and aliphatic dicarboxylic acids such as caprolactone, succinic acid, adipic acid and sebacic acid.

The diol component of the polyesters can be an aliphatic containing from 2 to 10 carbon atoms, preferably from 2 to 4 carbon atoms, or a cycloaliphatic diol having from 6 to 15 carbon atoms, or an aromatic diol having from 6 to 21 carbon atoms, or combinations thereof. Ethylene glycol is preferred. The polyesters can be branched or straight chain. However, as noted above, a non-compatible alloy polyester such as PBT is not utilized to form the compatible polycarbonate/polyester alloy. However, it can optionally be utilized in association therewith.

The amount of polyester, such as PET, in the alloy is generally from about 10 to about 90 parts by weight, desirably from about 15 to about 70 parts by weight, and preferably from about 30 to about 60 parts by weight based upon approximately 100 parts by weight of the polyester and the polycarbonate. The preparation of various polyesters is well known in the art and to the literature and the same are commercially available.

The polycarbonates of the present invention desirably are aromatic polycarbonates and contain the repetitive carbonate group

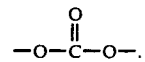

In the case of aromatic polycarbonates, the following unit is contained in the polymer and is generally attached to the carbonate group:

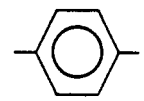

Preferred aromatic polycarbonates generally possess the following reoccurring structural units:

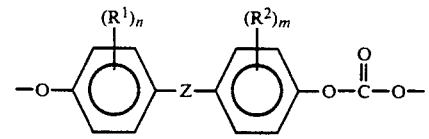

wherein Z is a single bond, an alkylene or alkylidene radical with 1 to about 7 carbon atoms, a cycloalkylene or cycloalkylidene radical with 5 to 12 carbon atoms, —O—, —S—, —CO—, —SO—, or —SO2—, and preferably is methylene. A highly preferred polycarbonate includes units derived from bisphenol-A and hence Z is 2-propylidene (i.e. isopropylidene). $R^1$ and $R^2$, independently, are hydrogen, a halogen such as bromine or chlorine, or an alkylene or alkylidene radical having from 1 to 7 carbon atoms; and n or m, independently, is 0 to 4. The aromatic polycarbonates generally have a melt flow rate range of from about 1 to about 24 grams/10 minutes at 300° C. as measured by ASTM D-1238.

Examples of aromatic polycarbonates are described in U.S. Pat. No. 4,034,016 to Barron and is hereby fully incorporated by reference. A highly preferred aromatic polycarbonate is the polycarbonate of bis(4-hydroxyphenyl)-2,2-propane, generally known as bisphenol-A polycarbonate.

The polycarbonates utilized in the present invention can optionally be copolymers containing repeating units therein derived from alkyl diol carbonate monomers generally having from 3 to 8 carbon atoms with 3 carbon atoms, e.g. isopropyl, being preferred. The amount of the comonomer repeat units within the polycarbonate copolymer is generally from 1 to about 99 percent by weight and preferably from about 5 to about 85 percent by weight based upon the total weight of the copolymer.

Desirably, the aromatic polycarbonates of the present invention have a weight average molecular weight of from about 15,000 to about 100,000, and preferably from about 20,000 to about 50,000. The various polycarbonate homopolymers or copolymers can be straight chain, can contain branched groups therein, or can contain cyclic groups therein. The amount of the polycarbonate is generally from about 10 to about 90 parts by weight, desirably from about 30 to about 85 parts by weight, and preferably from about 40 to about 70 parts by weight based upon approximately 100 parts by weight of the polyester and the polycarbonate.

An important aspect of the present invention is the use of a polyester compatibilization agent, i.e., a compound which is compatible with the polyester polymer, as well as a polycarbonate compatibilization agent, i.e., a compound which is compatible with the polycarbonate. Another requirement is that both the polyester compatibilization agent and the polycarbonate compatibilization agent generally have an affinity for and are compatible with each other.

The various polycarbonate compatibilization agents are generally multiphase polymer systems containing at least one rubbery polymer phase and at least one thermoplastic phase made from one or more monoethylenically unsaturated monomers. It is to be understood that the polycarbonate compatibilizing multiphase polymer systems can exist in many forms or configurations with a core-shell configuration being desired wherein the shell is often grafted onto a flexible core which is optionally crosslinked. Considering the polycarbonate compatibilization agent, it is generally made from a multiple-stage polymerization in which at least one phase, such as the core, is a rubbery polymer or an elastomer. The amount of the rubber stage can be from about 40 to about 99 percent, desirably from about 50 to about 90 percent, and preferably from about 55 to about 80 percent by weight based upon the total weight of the polyester compatibilization agent. The Tg of the rubbery phase is generally 10° C. or less, and preferably 0° C. or lower. Such rubbery polymers or elastomers can be made from conjugated dienes having from 4 to 16 carbon atoms, desirably from 4 to 8 carbon atoms, such as isoprene, chloroprene, and the like, with polybutadiene being preferred. However, rubbery polymers made from the conjugated dienes are generally not desired. Rather, various alkyl acrylates are preferred wherein the alkyl portion contains from 1 to 12 carbon atoms, desirably from 1 to 8 carbon atoms, with specific examples of alkyl acrylates including methyl acrylate, ethyl acrylate, n-butyl acrylate, and 2-ethyl acrylate with generally ethyl acrylate and n-butyl acrylate being preferred. Other acrylic monomers include arylalkyl esters of acrylic acid wherein the cyclic portion contains 5, 6, or 7 carbon atoms with or without an additional alkyl bridge, and the alkyl portion of the arylalkyl group containing up to 15 carbon atoms may be used; substituted acrylates or methacrylates containing up to 20 carbon atoms including alkylthioalkyl acrylates containing up to 20 carbon atoms such as ethyl thioethyl acrylate, and the like; alkoxyalkyl acrylates such as methoxyethyl acrylate; and the like. Other monomers include acrylamide, methacrylamide and alkyl acrylamides and alkyl methacrylamides, etc., as well as the hydroxyalkyl, haloalkyl, cyanoalkyl, and nitroalkyl derivatives thereof, all of which can contain up to 20 carbon atoms.

The one or more thermoplastic phases generally exist in an amount of from about 0 or 1 to about 60 weight percent, desirably from about 10 to about 50 weight percent, and preferably from about 20 to about 45 percent by weight of generally a non-rubbery type phase based upon 100 parts by weight of the polycarbonate compatibilization agent. Such one or more thermoplastic phases are generally made from monoethylenically unsaturated monomers with one such group being the various alkyl, cycloalkyl, etc., methacrylates wherein the alkyl, cycloalkyl, etc., portion has a total of generally from 1 to 15 carbon atoms, preferably from 1 to 8 carbon atoms, with specific examples including methyl methacrylate, butyl methacrylate, t-butyl methacrylate, propyl methacrylate, and the like, with methyl methacrylate being preferred. Another group of monomers are the various vinyl substituted aromatics containing a total of from 8 to 20 carbon atoms such as styrene, alpha-methyl styrene, alpha-halogenated styrene, alkyl styrene, amino styrene, and the like. Still another group of monomers which can be utilized as the one or more thermoplastic phases of the various vinyl cyanide compounds or derivatives thereof containing a total of from about 2 to about 8 carbon atoms such as acrylonitrile, methacrylonitrile, alpha-halogenated acrylonitriles, and the like with acrylonitrile being preferred.

Other less desirable monoethylenically unsaturated monomers which can be used to form the one or more remaining thermoplastic phases or, more desirably, as a comonomer with any of the above types of thermo-plastic-forming monomers as in an amount up to about 50 percent by weight and desirably up to about 25 percent by weight of the total weight of the thermoplastic phase monomer, are various other alkyl or aryl methacrylates, various alkyl or aryl acrylates, various alkyl or aryl acrylamides, various substituted alkyl or aryl methacrylates and acrylates such as halogen, alkoxy, alkylthio, cyanoalkyl, amino, alkylthio esters, and the like. Still other types of unsaturated monomers may include various vinyl esters, vinyl ethers, vinyl amides, vinyl ketones, vinyl halides, vinylidene halides, and the like. All of such monomers generally contain up to 20 carbon atoms, and often up to 10 carbon atoms.

The multiphase polycarbonate compatibilization agents of the present invention can optionally, but desirably, contain from about 0.1 to about 1.0 percent by weight of at least one polyethylenically unsaturated crosslinking monomer unit and optionally, but desirably, from about 0.1 to about 1.0 percent by weight of a graph-linking monomer unit. Examples of crosslinking monomers include the various polyacrylates and polymethacrylates, and monomers capable of ionic and coordinate crosslinking such as acid groups and organic and inorganic bases and other electron-donating groups coordinating with suitable electrophilic agents. The crosslinked elastomers are referred to as gelled interpolymers to describe that physical characteristic of the polymers. The polyethylenically unsaturated monomers include polyacrylic and polymethacrylic esters of polyols such as butylene diacrylate and dimethacrylate, trimethylolpropane trimethacrylate, and the like, di- and trivinyl benzene, vinyl acrylate and methacrylate and other crosslinking monomers.

The graft-linking monomers of the present invention are compounds having two or more additional polymerizable unsaturated reactive groups which participate in the polymerization reaction at substantially different rates, unlike the above-noted crosslinking agents which participate at the same rate. It is preferred to include compounds where at least one reactive group polymerizes at about the same rate, or slightly slower than the other monomers, while the remaining reactive group or groups polymerize at a substantially different, that is, slower, rate. The differential polymerization rates result in a residual level of unsaturation in the elastomeric phase, particularly during the latter stages of polymerization and, consequently, at or near the surface of the elastomer particles. When the rigid thermoplastic phase is subsequently polymerized at the surface of the elastomer, the residual unsaturated additional polymerizable reactive groups contributed by the graft-linking monomer participate in the subsequent reaction so that at least a portion of the following stage or stages, particularly the rigid phase, is chemically attached to the surface of the elastomer.

The compounds particularly preferred for use as graft-linking monomers in the present invention are allyl methacrylate and allyl acrylate. Other compounds suitable for use as graft-linking monomers in the present invention include, by way of example, allyl, methallyl, and crotyl esters of acrylic acid, methacrylic acid, maleic acid (mono- and di- esters); fumaric acid (mono- and di- esters) and itaconic acid (mono- and di- esters); allyl, methallyl and crotyl vinyl ether; allyl, methallyl, and crotyl vinyl thioether; N-allyl, methallyl or crotyl maleimide; vinyl esters of 3-butanoic and 4-pentenoic acids; triallyl cyanurate; o-allyl, methallyl, crotyl, o-alkyl, aryl, alkaryl or aralkyl P-vinyl, allyl, or methallyl phosphonate, triallyl, trimethallyl or tricotyl phosphate; O-vinyl, O,O-diallyl, dimethallyl or dicrotyl phosphate, cycloalkenyl esters of acrylic acid, methacrylic acid, maleic acid (mono- or di- esters), fumaric acid (mono- or di- esters), itaconic acid (mono- or di-esters), such as 2; 3; or 4-cyclohexenyl acrylate, bicyclo (2,2,1) hept-5-ene-2-yl esters of acrylic acid, methacrylic acid, maleic acid (mono- or di- esters), fumaric acid (mono- and di- esters) and itaconic acid (mono- or di- esters); vinyl ethers and vinyl thioethers of cycloalkenols and cycloalkene thiols such as vinyl cyclohex-4-ene-1-yl ether, vinyl ether of bicyclo (2,2,1) hept-5-ene-2-ol, vinyl esters of cycloalkene carboxylic acids such as vinyl cyclohex-3-ene-1-carboxylic acid or vinyl bicyclo (2,2,1) hept-5-ene-2-carboxylate, and the like.

Among the effective graft-linking monomers, allyl group-containing compounds are preferred, particularly allyl esters of ethylenically unsaturated acids. Most preferred are allyl acrylate, allyl methacrylate, diallyl maleate, diallyl fumarate, diallyl itaconate, allyl acid maleate, allyl acid fumarate, and allyl acid itaconate. Another category of allyl compounds which are highly effective, but not as preferred as the foregoing materials, are the diallyl esters of polycarboxylic acids which do not contain polymerizable unsaturation. Where two or more allyl groups occur in a single compound, one will tend to polymerize with substantially greater ease than another.

The various multiphase polycarbonate compatibilization agents can be produced in a conventional manner such as by bulk polymerization, suspension polymerization, bulk-suspension polymerization, solution polymerization, emulsion polymerization, and the like. When a graft copolymer is produced having a major proportion by weight of the rubbery polymer, the emulsion polymerization technique is generally utilized. As noted, the monoethylenically unsaturated monomer preferably forms the shell; but more than one such monomer can be utilized so that the shell is a copolymer. Examples of preferred polycarbonate compatibilization agents include generally a core-type shell multiple phase system wherein the rubbery core is made from n- butyl acrylate or ethyl acrylate and the shell is made from ethyl methacrylate or methyl methacrylate. The polycarbonate compatibilization agent generally is of a small particle size, such as having an average diameter of from about 0.2 to about 5.0 microns, and preferably from about 0.5 to about 2.0 microns.

Such multi-stage, generally core-shell polycarbonate compatibilization agents are commercially available from Rohm & Haas as Paraloid EXL-3330, 3386, 3339, and the like.

The amount of the polycarbonate compatibilization agent which is utilized is a effective amount which naturally has an affinity for polycarbonate and also for the polyester compatibilization agent. In other words, there is a chemical attraction as well as a chemical compatibility, as for example through hydrogen bonding, between the polycarbonate and the polyester compatibilization agent. Such effective amounts are generally from about 2.5 to about 40 parts by weight and preferably from about 5 to about 25 parts by weight for every 100 total parts by weight of the polycarbonate.

Another group of polycarbonate compatibilization agents are generally blends of multiphase systems containing at least one rubbery or elastomeric phase and generally two or more thermoplastic phases in association with a component which effectively increases adhesion of the compatibilization agent with the polycarbonate. Such compatibilization agents generally have a rubbery stage, desirably in the form of a core, which is made from conjugated dienes such as those set forth hereinabove and which are thus hereby fully incorporated by reference, with one or more thermoplastic phases such as a phase made from a monoethylenically unsaturated monomer such as those set forth hereinabove and which are thus fully incorporated by reference, e.g., an alkyl methacrylate, with still another thermoplastic phase such as made from various vinyl substituted aromatic monomers which have been set forth hereinabove and thus fully incorporated by reference, e.g., styrene, alphamethyl styrene, and the like. Such polycarbonate compatibilization agents are generally polyester compatibilization agents set forth hereinbelow and thus fully incorporated by reference and often referred to in the art as MBS-type systems, but contain effective amounts of a potentially reactive polycarbonate adhesive component or promotors in association therewith such that the resultant compatibilization agent mixture, blend, reaction, or combination thereof effectively acts, as a whole, as a polycarbonate compatibilization agent. Thus, the description of the polyester compatibilization agent set forth below is hereby fully incorporated by reference. Such polycarbonate adhesive components can generally be any type of component which has adhesion to the above-noted polycarbonate polymers. A desirable type of polycarbonate adhesive component is an antioxidant or heat stabilizer which is an aliphatic thioester such as

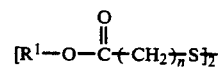

FORMULA I wherein $R^1$ is an alkyl having from 2 to about 40 carbon atoms, desirably from about 10 to about 32 carbon atoms, and preferably 18 carbon atoms, and n is an integer of from 1 to 6, desirably from 1 to 4, and preferably 2. The alkyl groups can be straight, branched, or cyclic. A specific example of such a polycarbonate adhesive component is distearyl thio dipropionate. Such components are known to the art and to the literature and are commercially available. A specific example of such material in combination with a multiphase-type compatibilization agent, e.g., methyl methacrylate, butadiene, and styrene, is Paraloid EXL-3647 made by Rohm & Haas, and the like.

Another type of a polycarbonate adhesive component is an antioxidant or heat stabilizer which is an aromatic phenol such as those having the formula

FORMULA II

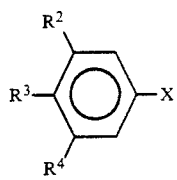

wherein $R^3$ is an alkyl group having from 1 to 18 carbon atoms, desirably from 1 to 10, and preferably 1, and $R^2$ and $R^4$, independently, are alkyl groups, desirably tertiary alkyl groups containing from 4 to 16 carbon atoms and preferably 4 carbon atoms. X is OH,

or

and the like. Such compounds are known to the art and to the literature and are commercially available. An example of a specific type of a polycarbonate adhesive component is ditertiary butyl hydroxy toluene. A specific example of such a polycarbonate adhesive agent in association with a multiphase-type compatibilization agent, e.g., methyl methacrylate, butadiene, and styrene, is Paraloid EXL-3691, made by Rohm & Haas.

The amount of the polycarbonate adhesive component, as noted above, is an effective amount to cause the generally MBS-type multiphase polymer system to act as a polycarbonate compatibilization agent. Such amounts are generally up to about 6 parts by weight, desirably from about 1 to about 5 parts by weight, and preferably from about 1 to about 3 parts by weight for every 100 parts of the generally MBS-type multiphase polymer system.

Examples of various polycarbonate compatibilization agents are set forth in the following Table wherein the abbreviations utilized relate to the following compounds:

BA = n-butyl acrylate
EA = ethyl acrylate
EHA = 2-ethylhexyl acrylate
BDA = 1,3-butylene diacrylate
AIMA = allyl methacrylate
St = styrene
MMA = methyl methacrylate
AN = acrylonitrile
DALM = diallyl maleate
BD = butadiene
AA = acrylic acid
DMAEMA = dimethylaminoethyl methacrylate
HEMA = 2-hydroxyethyl methacrylate
ETEMA = ethylthioethyl methacrylate
ALMA = allyl methacrylate
DALM = diallyl maleate
MAA = methacrylic acid

| POLYCARBONATE COMPATIBILIZATION AGENTS | | |
|---|---|---|
| NO. | COMPOSITION | MONOMER WEIGHT RATIOS |
| 1 | BA/DBA/AIMA-MMA/AIMA | 69.45/0.35/.28//19.95/9.97 |
| 2 | BA/BDA/DALM-MMA/AIMA | 69.45/0.35/.28//19.95/9.97 |
| 3 | BA/BDA/AIMA-AIHA | 89.19/0.45/.36//10.00 |
| 4 | BA/BDA/AIMA-MMA/AIMA | 69.45/0.35/.28//9.97/19.95 |
| 5 | BA/BDA/AIMA/MMA/DALM | 69.45/0.35/.28//19.95/9.97 |
| 6 | BA/BDA/AIMA-MMA/AIMA/EA | 69.45/0.35/.28//17.95/9.97/2.00 |
| 7 | BA/BDA/AIMA-MMA/AIMA | 69.45/0.35/.28//19.95/9.97 |
| 8 | BA/BDA/AIMA-St-MMA/EA | 59.48/0.30/.24//18/19.8/2.2 |
| 9 | BA/BDA/AIMA-St/MMA/EA | 59.48/0.30/.24//17.99/19.79/2.2 |
| 10 | BA/BDA/AIMA-MMA/EA | 59.48/0.30/.24//35.99/4 |
| 11 | BA/BDA/AIMA-MMA/EA | 72.61/0.37/.29//24.03/2.7 |
| 12 | BA/St-St-MMA/EA | 47/13/18//19.8/2.2 |
| 13 | BA/BDA/DALM-MMA | 69.3/0.35/.35//30 |
| 14 | EA/BDA/AIMA-St-MMA/EA | 59.47/0.30/.24//18.00-19.80/2.19 |
| 15 | BA/BDA/AIMA-St-MMA/EA | 59.5/0.30/.24/18-19.8/2.2 |
| 16 | EHA/BDA/AIMA-St-MMA/EA | 59.49/0.30/.24//18.00-19.81/2.15 |
| 17 | BA/BDA/AIMA-MMA/DALM | 69.36/0.35/.28//20/10 |
| 18 | BA/BDA/AIMA-AN/MMA | 69.34/0.35/.28//7.5/22.5 |
| 19 | BA/BDA/AIMA-AN/St | 69.34/0.35/.28//7.5/22.5 |
| 20 | BA/BDA/AIMA-AIMA-MMA/EA | 69.45/0.35/.28//9.97-17.95/2.00 |
| 21 | BA/BDA/AIMA-MMA/AA | 69.37/0.35/.28//25/5 |
| 22 | BA/BDA/AIMA-MMA/HEMA | 69.37/0.35/.28//20/10 |
| 23 | BA/BDA/AIMA-MMA/DMAEMA | 69.37/0.35/.28//26.5/3.5 |
| 24 | BA/BDA/AIMA-MMA/MAA | 69.37/0.35/.28//26.5/3.5 |
| 25 | BA/S/BDA/ALMA/MMA/AA | 57/13/0.35/0.14//28/2 |
| 26 | BA/S/ETEMA/BDA/ALMA//MMA/AA | 56.5/13/0.50/0.35/0.14//25/5 |
| 27 | BA/S/BDA/ALMA/MMA/MAA | 57/13/0.35/0.14//23/7 |
| 28 | BA/S/ETEMA/BDA/DALM//MMA/MAA | 56.5/13/0.50/0.35/0.14//21/9 |
| 29 | BA/S/BDA/ALMA/MMA/MAA/ME | 57/13/0.35/0.28//21/9/0.3 |
| 30 | BA/S/BDMA/ALMA/MMA/MAA | 40/9.5/0.5/0.35/0.14//35/15 |
| 31 | BA/S/ETEMA/BDA/ALMA//MMA/ALMA//S/AA | 40/9.5/0.5/0.25/0.10//20/0.10//15/15 |

The polyester compatibilization agent is also a multiphase polymer system containing an elastomer phase having a low Tg and at least one, but preferably two, thermoplastic phases having a higher Tg made from one or more vinyl monomers.

The polyester compatibilization agent is generally utilized in an amount of from about 2.5 to about 40 parts by weight and desirably from about 5 to about 25 parts by weight for every 100 parts by weight of the polyester polymer. As with the polycarbonate compatibilization agent, the polyester compatibilization agent can exist in many forms and configurations with generally a core-shell configuration being desired. The initial phase of the polyester compatibilization is generally one or more phases of a rubbery-type polymer or elastomer with one phase generally being preferred. The one or more elastomer phase is generally made from one or more conjugated diene monomers having from 4 to 12 carbon atoms, desirably from 4 to 6 carbon atoms with specific examples include butadiene, isoprene, hexadiene, and the like, with butadiene being highly preferred. The amount of one or more elastomer phases generally constitutes at least 40 percent by weight, generally from about 50 to about 90 percent by weight, desirably from about 65 to about 85 percent by weight, and preferably from about 70 to about 80 percent by weight based upon the total weight of the multiphase polyester compatibilization agent.

The remaining thermoplastic phases of the polyester compatibilization agent are generally made from a vinyl monomer and can be at least one or more phases with two phases made from two different types of vinyl monomers being preferred. The amount of the one or more remaining thermoplastic phases which are generally rigid and made from a vinyl monomer, is usually 60 percent by weight or less, generally from about 10 to about 50 percent by weight, desirably from about 15 to about 35 percent by weight, and preferably from about 20 to about 30 percent by weight. A preferred thermoplastic shell is made from a vinyl substituted aromatic monomer containing a total of from 8 to about 20 carbon atoms, and desirably from about 8 to about 12 carbon atoms with specific examples including alphamethyl styrene, α-halogenated styrene, ortho, para or meta mono-, di-, or tri- substituted styrene monomers wherein the substituent is an amine, an alkyl, an aryl, a ketone, an ether, a hydroxyl, a thio, an aldehyde, a halogen, and the like, with styrene being highly preferred.

Another type of preferred thermoplastic shell is made from the various alkyl methacrylate monomers wherein the alkyl portion has from 1 to 18 carbon atoms, preferably from 1 to 8 carbon atoms, such as methyl, ethyl, propyl, butyl, etc., with methyl methacrylate being highly preferred. Still another type of thermoplastic phase is that made from methacrylic acid esters and multi-functional alcohols having a total of up to 15 carbon atoms With specific examples including 1,3-butylene glycol dimethacrylate, trimethylol propane trimethacrylate, 1,3-butylenediacrylate, and the like.

Yet another type of thermoplastic phase are the various polymers made from vinyl cyanide monomers and derivatives thereof containing a total of up to 10 carbon atoms. Examples of such monomers are acrylonitrile, methacrylonitrile, alpha-halogen acrylonitrile, and the like.

When two or more thermoplastic phases are utilized to form a polyester compatibilization agent, the amount of each thermoplastic phase is generally from about 1 to about 25 percent by weight, desirably from about 5 to about 20 percent by weight, and preferably from about 10 to about 15 percent by weight. A highly preferred polyester compatibilization agent contains an elastomer phase made from butadiene and two thermoplastic phases made from styrene and methyl methacrylate.

The various polyester compatibilization agents described hereinabove are known to the art as well as to the literature and are commercially available. Included within such types of polyester compatibilization agents are the MBS-type compatibilization agents inasmuch as one thermoplastic phase or shell is generally an alkyl methacrylate, the rubbery phase is generally a butadiene core, with a remaining thermoplastic phase or shell being made from a vinyl substituted aromatic monomer such as styrene. Such multiphase compatabilization agents can be made by bulk polymerization, suspension polymerization, bulk-suspension polymerization, solution polymerization, or by emulsion polymerization. Often times, the one or more thermoplastic phases is grafted onto the butadiene stage which preferably exists as a rubbery core. In such an embodiment, conventional graft-linking monomers well known to the art and to the literature can be utilized, such as the various allyl esters of ethylenically unsaturated acids such as allyl acrylate, allyl methacrylate, diallyl maleate, diallyl fumarate, and the like.

Such polyester compatibilization agents in the form of a core-shell system are commercially available from Rohm & Haas as Paraloid EXL-3607, and the like.

The compatible polyester/polycarbonate system of the present invention is a blend and a true alloy since, as noted above, phase separation cannot be detected between the polyester, the polycarbonate, the polyester compatibilization agent, and the polycarbonate compatibilization agent when utilizing TEM electron micrographs at 10,000 through 50,000 X magnification and typically at 25,000 X magnification. Thus, a four-component alloy generally exists. Although it is not fully understood why a miscible alloy is obtained, it is thought that the polyester compatibilization agent and the polycarbonate compatibilization agent generally have high Tg acrylic-rich outer shells, and they adhere to each other and have good adhesion affinity towards polyester and polycarbonate.

The compatible polyester/polycarbonate alloys of the present invention can optionally contain small amounts of a non-compatible alloy polyester, as noted above, such as PBT or solely aromatic polyesters, that is, made form solely aromatic dicarboxylic acids and solely aromatic diols. When PBT or the non-compatible alloy polyester is utilized, it forms an immiscible dispersed phase with the compatible alloy. The amount of the optional PBT, etc., is up to about 55 parts by weight and preferably up to about 35 parts by weight based upon 100 parts by weight of the polycarbonate, the PET, and PBT.

Various additives known to the art and to the literature can also be utilized in association with the above compatible alloy composition. Depending upon the type and function of additive, typically up to about 30 parts by weight can be utilized per 100 parts by weight of the PET polycarbonate alloy. Useful additives often include various antioxidants such as hindered phenols and/or phosphites; various flame retardants such as antimony oxide; and/or halogenated organic compounds such as dipentaerithritol, tetrabromobisphenol A carbonate oligomer, brominated polystyrene, melamine cyanurate, brominated phenoxy polymers, dioctyl tetrabromo terephthalate, decabromodiphenyloxide, tetrabromobisphenol A, brominated polymeric epoxy, polydibromophenylene oxide, and the like; various UV inhibitors such as hindered amines, substituted hydroxyphenyl benzotriazoles, carbon black, benzophenone, barium metaborate monohydrate, various phenylsalicylates, nickel dibutyl dithiocarbamate, phenylformamidine; various fillers such as clay, talc, silica, and pigments, for example carbon black, titanium dioxide, etc., typically in amounts up to about 50 parts by weight per 100 parts by weight of the polycarbonate and the PET; and the like.

Various fibers constitute an important class which can be optionally utilized as reinforcing agents in amounts up to about 60 parts by weight and preferably up to 50 parts by weight per 100 parts by weight of the polycarbonate and the polyester. Typical fibers, which can be chopped or continuous, include glass, carbon, graphite, aromatic nylons such as Kevlar, stainless steel, boron, and the like. The diameter of the various fibers can vary, with a desirable range being from about 4 to about 30 microns and preferably from about 8 to about 11 microns.

The compatible PET-polycarbonate alloys of the present invention are generally made by blending all of the various components together in the presence of heat and sufficient shear to achieve compatibilization. That is, all of the various components such as the PET polyester, the polycarbonate homopolymer or copolymer, the PET polyester compatibilization agent, and the polycarbonate compatibilization agent, the optional PBT, as well as any additives and reinforcing fibers are generally added to a suitable mixing device capable of producing moderate to high shear. Examples of specific mixing or blending devices generating sufficient shear to compatibilize the components include a Banbury mixer, a Buss kneader, a single screw extruder, a twin screw extruder, and the like. Suitable shear is generally at least 500 reciprocal seconds or greater, and often 2,000 reciprocal seconds or less. The mixing or blending is done in the presence of sufficient heat such that the PET is melted. Generally, the melting point of the PET will vary with the intrinsic viscosity, but typically is from about 250° C. to about 270° C. Blending is continued for a sufficient period of time such that a fully compatible alloy is produced. Often, the various fibers can be added during the mixing process to ensure that they are not unduly broken. While it is desirable to add all of the various components initially to a mixing device and then heat and blend, it is to be understood that only part of the various components can be added and blended, followed by subsequent addition and blending of the various remaining one or more components.

The compatible polyester/polycarbonate alloys of the present invention are thermoplastics and hence can be formed into final products utilizing conventional thermoplastic processing equipment as by extruding, injection molding, blow molding, and the like. The compatible alloys of the present invention have unexpectedly been found to have very good physical properties. Generally, the polycarbonate component has been found to impart good notched Izod impact strength and high heat deflection temperature properties to the compatible alloy, with the various favorable properties of PET such as solvent resistance, UV-resistance, good elongation, and the like, being retained. The compatible PET/polycarbonate alloys of the present invention generally have notched Izod impact properties of 7.0 ft.lb./in. or greater, desirably at least 14.0 or greater, preferably 20.0 or greater, and even greater than 25.0 ft.lb./in. according to ASTM Test No. D-256. It was unexpected that such high impact properties would be obtained when a composition was utilized containing fairly significant amounts of PET.

Another notable property is that of heat deflection temperature. Such temperatures tend to be inversely proportional with the amount of co-compatibilizing agents utilized. Generally, heat deflection temperatures of at least 65° C., desirably at least 75° C., and preferably from about 80° to about 90° C. at 264 psi are readily obtained.

Still another advantage of the compatible PET/polycarbonate alloys of the present invention is that they have good paint adhesion, generally requiring no primer, and have good solvent and chemical resistance.

In view of the thermoplastic nature of the alloys and their physical properties, they can be utilized as exterior body panels on various vehicles such as automobiles, for bumpers and bumper guards of various vehicles, in various sporting goods such as ski boots, and the like.

The invention will be better understood by reference to the following examples.

EXPERIMENTS

The following examples illustrate the invention wherein the percentages are by weight unless indicated.

The polycarbonate polyester alloys were prepared as follows:

The dried polycarbonate and/or polyester and the compatibilization agents were premixed by tumbling in a polyethylene bag before melt processing. The mixtures were then blended in either twin screw extruder, single screw extruder, or a continuous processor. The injection-molded samples of these alloys were then tested using the following test procedures in the dry-as-molded state:

| | |
|---|---|
| Notched Izod Toughness | ASTM D256 |
| Tensile Strength | ASTM D638 |
| Elongation to Break | ASTM D638 |
| Flexural Modulus | ASTM D790 |
| Flexural Strength | ASTM D790 |
| Melt Flow | ASTM D-1238-73 Condition G |
| Particle Size | Transmission Electron Microscopy of very thin microtome slice |
| Heat Deflection Temperature | ASTM D648-82 (at 264 psi) |
| Mold Shrinkage | ASTM D 955 |
| Gardner Impact | ASTM D 3029 |

CHEMICAL DESCRIPTION OF COMPATIBILIZING AGENTS (APPROXIMATE AMOUNTS - MOLE PERCENT)

POLYCARBONATE
Paraloid

EXL-3330 67.5 MMA; 35 BA
EXL-3386 59 MMA; 41 BA
EXL-3339 67.5 MMA; 35 BA
EXL-3647 14.2 MMA; 78.4 BD; 14.2 STYRENE;
2.3 WEIGHT PERCENT DISTEARYL THIO DIPROPIONATE
EXL-3691 12.5 MMA; 77.4 BD; 10.1 STYRENE;
1.6 WEIGHT PERCENT DITERTYL BUTYL HYDROXY TOLUENE

POLYESTER
Paraloid

EXL-3607; 13.2 MMA; 75.5 BD; 11.2 Styrene

PROCESSING EQUIPMENT UTILIZED IN EXAMPLES

Single Screw Extruder

Berlyn 2½", 30:1 L/D with vacuum vent high mixing screw design.

Twin Screw Extruder

Leistritz 34 mm, 28:1 L/D with counter-rotating intermeshing and with vacuum venting capability.

Twin Screw Extruder

Werner-Pfleiderer, 30 mm, 42:1 L/D, with corotating intermeshing and with vacuum venting capability.

Twin Screw Extruder

Welding Engineer, 30 mm, 42:1 L/D, with counter-rotating non-intermeshing and with vacuum venting capability.

Continuous Mixer

Farrel Continuous Mixer, CP-23, with vacuum venting capability.

Buss Kneader 46 mm, 20:1 L/D with vacuum venting capability.

Processing Shear Rate Range 500 to 2,000 sec.$^{-1}$

Processing Temperature Range

490° F. to 470° F.

EXPERIMENT 1

The alloys of PET (IV=0.95) with polycarbonate (Examples 1 through 6 of Table I) were prepared by melt blending utilizing a counter-rotating twin screw extruder at 490° F. to 530° F. melting temperature. The alloys of PET (IV-0.95) with polycarbonate using EXL-3647 as a compatibilization agent for polycarbonate and EXL-3607 as a compatibilizing agent for PET which has higher acrylic outer shell content and which has affinity to polycarbonate were melt-mixed. As apparent from Table I, alloys which contain both the PET compatibilization agent as well as the polycarbonate compatibilization agent had an unexpected increase in the notched Izod properties inasmuch as a factor of at least approximately 3 was obtained.

EXPERIMENT 2

The alloys of PET (IV-0.95) with polycarbonate were prepared by melt-blending utilizing a counter-rotating twin screw extruder at 490° F. to 530° F. melting temperature. In this example, EXL-3691 was used as a compatibilization agent for polycarbonate and EXL-3607 as a compatibilization agent for PET in all of the six examples of Table II. Moreover, EXL-3647 was utilized as a PET co-compatibilization agent in Examples 4, 5 and 6.

As apparent from Table II, when no polyester compatibilization agent was utilized, as in Example 1, poor notched Izod impact properties were obtained. However, in Examples 2 and 3 wherein a PET compatibilization agent as well as a polycarbonate compatibilization was utilized, unexpected and dramatic improvements in the notched Izod impact properties were obtained. Again, in Examples 4, 5 and 6 wherein two different types of polycarbonate compatibilization agents were utilized, but no polyester compatibilization agents, once again poor notched Izod impact properties were obtained.

EXPERIMENT 3

Example 1 of Table III was prepared using PET (IV=0.95) with polycarbonate utilizing FCM-CP-23, whereas Example 2 utilized the single screw extruder. Example 3 of Table III was also prepared utilizing an FCM-CP-23 with a PET having an IV of 0.65. Examples 4, 5, and 6 of Table III were made utilizing a single screw extruder as in Example 2, but utilizing reground PET having an IV of 0.75 (bottle grade). All of the alloys were made in a manner similar to Experiment 1.

As apparent from Table III, the alloy made utilizing a single screw extruder provided a very high notched Izod impact value. Although Examples 3 through 6 utilized PET with lower IV's, high notched Izod impact values were still obtained.

EXPERIMENT 4

Various alloys of polycarbonate and PET (IV=0.95) were prepared as set forth in Table IV in a manner similar to Example 1. In Table IV, the amounts of the PET compatibilization agent as well as the polycarbonate compatibilization agent were varied. As apparent from Table IV, when the amount of both the PET compatibilization agent and the polycarbonate compatibilization agent were reduced to low levels, poor notched Izod impact properties were obtained, i.e. Examples 4 and 5. Although the amount of such agents were also reduced in Example 3, a major amount of polycarbonate existed such that a high notched Izod impact value was nevertheless still obtained.

EXPERIMENT 5

Table V relates to various alloys of PET (IV=0.95) with polycarbonate prepared utilizing a counter-rotating twin screw extruder at conditions similar to Experiment 1.

EXPERIMENT 6

The alloys set forth in Table VI relate to compatible blends of PET (IV=0.95) with polycarbonate which were prepared in a co-rotating twin screw extruder at 490° F. to 540° F. in a manner similar to Experiment 1. As apparent from Table VI, good notched Izod impact properties as well as good heat deflection temperature properties were obtained when the concentration of PET and polycarbonate were varied from 15 percent to 70 percent by weight.

EXPERIMENT 7

Table VII relates to alloys of PET (IV=0.95) with polycarbonate as well as various amounts of PBT. The alloys were prepared utilizing a co-rotating twin screw extruder at temperatures of 490° F. to 540° F. in a manner similar to Experiment 1. The amounts of the pET in polycarbonate were varied as was the amount of the PBT. As apparent from Table VII, good notched Izod properties were obtained although the heat deflection temperatures were not as good as those set forth in Table VI. The PBT existed as a separate phase within the compatible homogeneous phase of the PET-Polycarbonate alloy.

EXPERIMENT 8

Table VIII sets forth one example of an alloy of PET and PBT (RV=1.1) blended with polycarbonate. Inasmuch as the PET compatibilization agent EXL-3607 was not as good a compatibilization agent with respect to PBT, a true alloy was not obtained, but rather a blend containing phase separation therein. Moreover, as apparent from the data in Table VIII, low notched Izod impact properties as well as heat deflection properties were obtained in comparison with the examples of Table VII.

The alloys of Tables I through vI resulted in a homogeneous PET-polycarbonate alloy inasmuch as no microphase separation of PET and polycarbonate were detected by TEM MICROGRAPHS.

TABLE I

|  | 1 | 2 | 3 | 4 | 5 | 6 |
|---|---|---|---|---|---|---|
| PET (wt. %) | 45 | 60 | 45 | 60 | 45 | 45 |
| COMPATABILIZATION AGENT (PARALOID) | EXL-3607 | EXL-3607 | EXL-3607 | EXL-3607 | EXL-3607 | EXL-3607 |
| COMPATABILIZATION AGENT (wt. %) | 15 | 20 | 15 | 20 | 7.5 | 5 |
| POLYCARBONATE (wt. %) | 40 | 20 | 40 | 20 | 40 | 40 |
| POLYCARBONATE COMPATIBILIZATION AGENT (PARALOID) | — | — | — | — | EXL-3647 | EXL-3647 |
| POLYCARBONATE COMPATIBILIZATION AGENT (wt. %) | — | — | — | — | 7.5 | 10 |
| PROPERTIES: |  |  |  |  |  |  |
| TENSILE STRENGTH (psi) | 4500 | 5100 | 6400 | 5300 | 6300 | 6500 |
| ELONGATION TO YIELD (%) | — | 5.6 | 6.3 | 5.5 | 6.1 | 5.8 |
| ELONGATION TO BREAK (%) | 11.5 | 25.9 | 204 | 251 | 210 | 235 |
| FLEXURAL STRENGTH (psi) | 10800 | 9200 | 11300 | 9500 | 1200 | 11700 |
| FLEXURAL MODULUS (kpsi) | 287 | 256 | 291 | 274 | 301 | 309 |
| NOTCHED IZOD IMPACT (⅛") |  |  |  |  |  |  |
| AT 73° F. (ft. lb/in) | 2.9 | 2.4 | 4.7 | 3.1 | 13.2 | 13.2 |
| AT −40° F. (ft. lb/in) | — | — | 1.8 | — | 3.4 | 2.3 |
| GARDNER IMPACT (⅛") |  |  |  |  |  |  |
| AT 73° F. (in. lb) | 3 | 24 | >320 | >320 | 316 | >320 |
| AT −40° F. (in. lb) | — | — | 305 | 13 | 314 | 53 |
| HEAT DEFLECTION TEMPERATURE AT 264 psi (°C.) | 76 | 73 | 73 | 70 | 76 | 82 |

TABLE II

|  | 1 | 2 | 3 | 4 | 5 | 6 |
|---|---|---|---|---|---|---|
| PET (wt. %) | 45 | 45 | 45 | 45 | 45 | 45 |
| COMPATABILIZATION AGENT (PARALOID) | — | EXL-3607 | EXL-3607 | — | — | — |
| COMPATABILIZATION AGENT (wt. %) | — | 7.5 | 10 | — | — | — |
| POLYCARBONATE (wt. %) | 40 | 40 | 40 | 40 | 40 | 40 |
| POLYCARBONATE COMPATIBILIZATION AGENT (PARALOID) | EXL-3691 | EXL-3691 | EXL-3691 | EXL-3691 | EXL-3691 | EXL-3691 |
| POLYCARBONATE COMPATIBILIZATION AGENT (wt. %) | 15 | 7.5 | 5 | 7.5 | 10 | 5 |
| POLYCARBONATE COMPATIBILIZATION AGENT (Paraloid) | — | — | — | EXL-3647 | EXL-3647 | EXL-3647 |
| POLYCARBONATE COMPATIBILIZATION AGENT (wt. %) | — | — | — | 7.5 | 5 | 10 |
| PROPERTIES: |  |  |  |  |  |  |
| TENSILE STRENGTH (psi) | 5500 | 6700 | 6400 | 6200 | 5900 | 6400 |
| ELONGATION TO YIELD (%) | — | 6.5 | 6.7 | 6.9 | 6.8 | — |
| ELONGATION TO BREAK (%) | 5.3 | 179 | 193 | 20.3 | 13.4 | 6.9 |
| FLEXURAL STRENGTH (psi) | 10200 | 11800 | 11400 | 12000 | 11900 | 12400 |
| FLEXURAL MODULUS (kpsi) | 274 | 303 | 298 | 307 | 298 | 308 |
| NOTCHED IZOD IMPACT (⅛") |  |  |  |  |  |  |
| AT 73° F. (ft. lb/in) | 0.3 | 23.9 | 15.4 | 1.5 | 1.2 | 0.2 |
| AT −40° F. (ft. lb/in) | — | 4.1 | 3.4 | — | — | — |
| GARDNER IMPACT (⅛") |  |  |  |  |  |  |
| AT 73° F. (in. lb) | 3 | >320 | >320 | 3 | 3 | <2 |
| AT −40° F. (in. lb) | — | 145 | 301 | — | — | — |
| HEAT DEFLECTION TEMPERATURE AT 264 psi (°C.) | 72 | 78 | 78 | 81 | 83 | 81 |

TABLE III

|  | 1 | 2 | 3 | 4 | 5 | 6 |
|---|---|---|---|---|---|---|
| PET (wt. %) | 45 | 45 | 45 | 45 | 45 | 45 |
| COMPATABILIZATION AGENT (PARALOID) | EXL-3607 | EXL-3607 | EXL-3607 | EXL-3607 | EXL-3607 | EXL-3607 |
| COMPATABILIZATION AGENT (wt. %) | 7.5 | 7.5 | 7.5 | 7.5 | 7.5 | 7.5 |
| POLYCARBONATE (wt. %) | 40 | 40 | 40 | 40 | 40 | 40 |
| POLYCARBONATE COMPATIBILIZATION AGENT (PARALOID) | EXL-3647 | EXL-3647 | EXL-3647 | EXL-3647 | EXL-3647 | EXL-3647 |
| POLYCARBONATE COMPATIBILIZATION AGENT (wt. %) | 7.5 | 7.5 | 7.5 | 7.5 | 7.5 | 10.0 |
| PROPERTIES: |  |  |  |  |  |  |
| TENSILE STRENGTH (psi) | 7844 | 6754 | 6686 | 7000 | 7205 | 7340 |

TABLE III-continued

|  | 1 | 2 | 3 | 4 | 5 | 6 |
|---|---|---|---|---|---|---|
| ELONGATION TO YIELD (%) | 186 | 5.7 | 53 | 5.1 | 5.4 | 5.3 |
| ELONGATION TO BREAK (%) | 187 | 94.6 | 100.6 | 13.0 | 22.8 | 22.2 |
| FLEXURAL STRENGTH (psi) | 10040 | 9830 | 9880 | 10700 | 10500 | 10990 |
| FLEXURAL MODULUS (kpsi) | 292 | 286 | 284 | 293 | 292 | 296 |
| NOTCHED IZOD IMPACT (⅛") | | | | | | |
| AT 73° F. (ft. lb/in) | 12.4 | >25 | 10.9 | 9.1 | 9.1 | 9.6 |
| AT −40° F. (ft. lb/in) | 3.4 | 9.1 | 3.3 | 2.04 | 2.27 | 2.1 |
| GARDNER IMPACT (⅛") | | | | | | |
| AT 73° F. (in. lb) | >320 | >320 | >320 | >320 | >320 | >320 |
| AT −40° F. (in. lb) | >320 | >320 | >320 | 50 | 16 | 10 |
| HEAT DEFLECTION TEMPERATURE AT 264 psi (°C.) | 74 | 74 | 74 | 74 | 78 | 76 |

TABLE IV

|  | 1 | 2 | 3 | 4 | 5 | 6 |
|---|---|---|---|---|---|---|
| PET (wt. %) | 40 | 42.35 | 44.7 | 52 | 50.3 | 47.65 |
| COMPATABILIZATION AGENT (PARALOID) | EXL-3607 | EXL-3607 | EXL-3607 | EXL-3607 | EXL-3607 | EXL-3607 |
| COMPATABILIZATION AGENT (wt. %) | 7.5 | 5.0 | 2.5 | 1.0 | 2.5 | 5.0 |
| POLYCARBONATE (wt. %) | 45 | 47.65 | 50.3 | 46 | 44.7 | 42.35 |
| POLYCARBONATE COMPATIBILIZATION AGENT (PARALOID) | EXL-3647 | EXL-3647 | EXL-3647 | EXL-3647 | EXL-3647 | EXL-3647 |
| POLYCARBONATE COMPATIBILIZATION AGENT (wt. %) | 7.5 | 5.0 | 2.5 | 1.0 | 2.5 | 5.0 |
| PROPERTIES: | | | | | | |
| TENSILE STRENGTH (psi) | 7808 | 8593 | 8859 | 8857 | 8967 | 8212 |
| ELONGATION TO YIELD (%) | 195.8 | 204.1 | 151.9 | 190 | 235 | 225 |
| ELONGATION TO BREAK (%) | 196.8 | 207.3 | 174.4 | 192 | 238 | 227 |
| FLEXURAL STRENGTH (psi) | 10330 | 11500 | 12620 | 13360 | 12510 | 10980 |
| FLEXURAL MODULUS (kpsi) | 280 | 310 | 336 | 357 | 335 | 304 |
| NOTCHED IZOD IMPACT (⅛") | | | | | | |
| AT 73° F. (ft. lb/in) | 11.3 | 11.2 | 10.3 | 1.48 | 1.34 | 13.8 |
| AT −40° F. (ft. lb/in) | 5.2 | 2.1 | 1.3 | 1.4 | 1.30 | 1.7 |
| GARDNER IMPACT (⅛") | | | | | | |
| AT 73° F. (in. lb) | >320 | >320 | >320 | >320 | >320 | >320 |
| AT −40° F. (in. lb) | >320 | >320 | >320 | >320 | >320 | >320 |
| HEAT DEFLECTION TEMPERATURE AT 264 psi (°C.) | 83 | 89 | 95 | 83.0 | 80.5 | 80.0 |

TABLE V

|  | 1 | 2 | 3 | 4 |
|---|---|---|---|---|
| PET (wt. %) | 45 | 45 | 45 | 45 |
| COMPATABILIZATION AGENT (PARALOID) | EXL-3647 | EXL-3647 | EXL-3607 | EXL-3607 |
| COMPATABILIZATION AGENT (wt. %) | 5 | 7.5 | 5 | 7.5 |
| POLYCARBONATE (wt. %) | 40 | 40 | 40 | 40 |
| POLYCARBONATE COMPATIBILIZATION AGENT (PARALOID) | EXL-3339 | EXL-3339 | EXL-3339 | EXL-3339 |
| POLYCARBONATE COMPATIBILIZATION AGENT (wt. %) | 10 | 7.5 | 10 | 7.5 |
| PROPERTIES: | | | | |
| TENSILE STRENGTH (psi) | 5261 | 6541 | 6506 | 6859 |
| ELONGATION TO YIELD (%) | 5.7 | 10.4 | 10.9 | 10.4 |
| ELONGATION TO BREAK (%) | 23 | 65.7 | 170.1 | 285.8 |
| FLEXURAL STRENGTH (psi) | 11760 | 11290 | 11130 | 11250 |
| FLEXURAL MODULUS (kpsi) | 326 | 301 | 301 | 310 |
| NOTCHED IZOD IMPACT (⅛") | | | | |
| AT 73° F. (ft. lb/in) | 17.1 | 11.36 | 14.0 | 14.3 |
| AT −40° F. (ft. lb/in) | 1.0 | 1.01 | 2.03 | 1.79 |
| GARDNER IMPACT (⅛") | | | | |
| AT 73° F. (in. lb) | >320 | >320 | >320 | >320 |
| AT −40° F. (in. lb) | >320 | >320 | >320 | >320 |
| HEAT DEFLECTION TEMPERATURE AT 264 psi (°C.) | 80 | 81 | 72 | 73 |

TABLE VI

|  | 1 | 2 | 3 | 4 | 5 | 6* |
|---|---|---|---|---|---|---|
| PET (wt. %) | 70 | 65 | 60 | 55 | 50 | 45 |
| COMPATABILIZATION AGENT (PARALOID) | EXL-3607 | EXL-3607 | EXL-3607 | EXL-3607 | EXL-3607 | EXL-3607 |
| COMPATABILIZATION AGENT (wt. %) | 7.5 | 7.5 | 7.5 | 7.5 | 7.5 | 7.5 |
| POLYCARBONATE (wt. %) | 15 | 20 | 25 | 30 | 35 | 40 |
| POLYCARBONATE COMPATIBILIZATION AGENT (PARALOID) | EXL-3647 | EXL-3647 | EXL-3647 | EXL-3647 | EXL-3647 | EXL-3647 |
| POLYCARBONATE COMPATIBILIZATION | 7.5 | 7.5 | 7.5 | 7.5 | 7.5 | 7.5 |

TABLE VI-continued

| AGENT (wt. %) PROPERTIES: | | | | | | |
|---|---|---|---|---|---|---|
| TENSILE STRENGTH (psi) | 6453 | 6550 | 6902 | 6768 | 6885 | 7034 |
| ELONGATION TO YIELD (%) | 9.0 | 9.6 | 9.7 | 9.4 | 9.5 | 9.9 |
| ELONGATION TO BREAK (%) | 526 | 468 | 387 | 317 | 367 | 327 |
| FLEXURAL STRENGTH (psi) | 10720 | 11220 | 11730 | 11410 | 11580 | 11710 |
| FLEXURAL MODULUS (kpsi) | 307 | 324 | 348 | 330 | 318 | 323 |
| NOTCHED IZOD IMPACT (⅛") | | | | | | |
| AT 73° F. (ft. lb/in) | 24.3 | 25.2 | 26.2 | 22.0 | 25.7 | 25.4 |
| AT −40° F. (ft. lb/in) | 1.1 | 1.1 | 1.1 | 5.2 | 3.6 | 4.2 |
| GARDNER IMPACT (⅛") | | | | | | |
| AT 73° F. (in. lb) | >320 | >320 | >320 | >320 | >320 | >320 |
| AT −40° F. (in. lb) | 3.5 | — | — | >320 | >320 | >320 |
| HEAT DEFLECTION TEMPERATURE AT 264 psi (°C.) | 74 | 75 | 75.5 | 76.5 | 74 | 79.5 |

| | 7 | 8 | 9 | 10 | 11 | 12 |
|---|---|---|---|---|---|---|
| PET (wt. %) | 40 | 35 | 30 | 25 | 20 | 15 |
| COMPATABILIZATION AGENT (PARALOID) | EXL-3607 | EXL-3607 | EXL-3607 | EXL-3607 | EXL-3607 | EXL-3607 |
| COMPATABILIZATION AGENT (wt. %) | 7.5 | 7.5 | 7.5 | 7.5 | 7.5 | 7.5 |
| POLYCARBONATE (wt. %) | 45 | 50 | 55 | 60 | 65 | 70 |
| POLYCARBONATE COMPATIBILIZATION AGENT (PARALOID) | EXL-3647 | EXL-3647 | EXL-3647 | EXL-3647 | EXL-3647 | EXL-3647 |
| POLYCARBONATE COMPATIBILIZATION AGENT (wt. %) | 7.5 | 7.5 | 7.5 | 7.5 | 7.5 | 7.5 |
| PROPERTIES: | | | | | | |
| TENSILE STRENGTH (psi) | 7366 | 7491 | 7631 | 7702 | 7866 | 7434 |
| ELONGATION TO YIELD (%) | 10.2 | 9.7 | 9.9 | 10.1 | 10.4 | 10.7 |
| ELONGATION TO BREAK (%) | 291 | 149 | 223 | 200 | 182 | 192 |
| FLEXURAL STRENGTH (psi) | 12150 | 13270 | 12840 | 13520 | 13530 | 13020 |
| FLEXURAL MODULUS (kpsi) | 336 | 370 | 350 | 363 | 369 | 346 |
| NOTCHED IZOD IMPACT (⅛") | | | | | | |
| AT 73° F. (ft. lb/in) | 20.8 | 11.6 | 14.4 | 13.4 | 12.2 | 10.4 |
| AT −40° F. (ft. lb/in) | 4.7 | 2.0 | 5.8 | 5.2 | 7.9 | 7.6 |
| GARDNER IMPACT (⅛") | | | | | | |
| AT 73° F. (in. lb) | >320 | >320 | >320 | >320 | >320 | >320 |
| AT −40° F. (in. lb) | >320 | >320 | >320 | >320 | >320 | >320 |
| HEAT DEFLECTION TEMPERATURE AT 264 psi (°C.) | 86 | 87 | 88 | 95.5 | 99 | 95.5 |

*Control Formulation

TABLE VII

| | 1 | 2 | 3 | 4 | 5 | 6* |
|---|---|---|---|---|---|---|
| PET (wt. %) | 35 | 32.5 | 30 | 27.5 | 25 | 22.5 |
| COMPATABILIZATION AGENT (PARALOID) | EXL-3607 | EXL-3607 | EXL-3607 | EXL-3607 | EXL-3607 | EXL-3607 |
| COMPATABILIZATION AGENT (wt. %) | 7.5 | 7.5 | 7.5 | 7.5 | 7.5 | 7.5 |
| POLYCARBONATE (wt. %) | 15 | 20 | 25 | 30 | 35 | 40 |
| POLYCARBONATE COMPATIBILIZATION AGENT (PARALOID) | EXL-3647 | EXL-3647 | EXL-3647 | EXL-3647 | EXL-3647 | EXL-3647 |
| POLYCARBONATE COMPATIBILIZATION AGENT (wt. %) | 7.5 | 7.5 | 7.5 | 7.5 | 7.5 | 7.5 |
| PBT (wt %) | 35 | 32.5 | 30 | 27.5 | 25 | 22.5 |
| PROPERTIES: | | | | | | |
| TENSILE STRENGTH (psi) | 5858 | 5537 | 5353 | 5833 | 6349 | 6443 |
| ELONGATION TO YIELD (%) | 5.1 | 4.9 | 4.8 | 5.6 | 6.3 | 6.5 |
| ELONGATION TO BREAK (%) | 548 | 530 | 633 | 528 | 482 | 413 |
| FLEXURAL STRENGTH (psi) | 9738 | 9364 | 9071 | 1070 | 10490 | 10720 |
| FLEXURAL MODULUS (kpsi) | 281 | 279 | 279 | 292 | 293 | 295 |
| NOTCHED IZOD IMPACT (⅛") | | | | | | |
| AT 73° F. (ft. lb/in) | 22.3 | 22.2 | 20.64 | 25.0 | 25.0 | 19.9 |
| AT −40° F. (ft. lb/in) | 20 | 12.7 | 7.28 | 19.0 | 20.0 | 13.0 |
| GARDNER IMPACT (⅛") | | | | | | |
| AT 73° F. (in. lb) | >320 | >320 | >320 | >320 | >320 | >320 |
| AT −40° F. (in. lb) | >320 | 316 | 316 | 313 | >320 | >320 |
| HEAT DEFLECTION TEMPERATURE AT 264 psi (°C.) | 69.5 | 68.5 | 59 | 63 | 64 | 68.5 |

| | 7 | 8 | 9 | 10 | 11 | 12 |
|---|---|---|---|---|---|---|
| PET (wt. %) | 20 | 17.5 | 15 | 12.5 | 10.0 | 7.5 |
| COMPATABILIZATION AGENT (PARALOID) | EXL-3607 | EXL-3607 | EXL-3607 | EXL-3607 | EXL-3607 | EXL-3607 |
| COMPATABILIZATION AGENT (wt. %) | 7.5 | 7.5 | 7.5 | 7.5 | 7.5 | 7.5 |
| POLYCARBONATE (wt. %) | 45 | 50 | 55 | 60 | 65 | 70 |
| POLYCARBONATE COMPATIBILIZATION AGENT (PARALOID) | EXL-3647 | EXL-3647 | EXL-3647 | EXL-3647 | EXL-3647 | EXL-3647 |
| POLYCARBONATE COMPATIBILIZATION AGENT (wt. %) | 7.5 | 7.5 | 7.5 | 7.5 | 7.5 | 7.5 |
| PBT (wt %) | 20 | 17.5 | 15 | 12.5 | 10.0 | 7.5 |

TABLE VII-continued

| PROPERTIES: | | | | | | |
|---|---|---|---|---|---|---|
| TENSILE STRENGTH (psi) | 7052 | 6850 | 7154 | 7088 | 7101 | 7192 |
| ELONGATION TO YIELD (%) | 6.7 | 6.6 | 7.0 | 7.2 | 7.6 | 8.0 |
| ELONGATION TO BREAK (%) | 254 | 186 | 227 | 211 | 195 | 62.8 |
| FLEXURAL STRENGTH (psi) | 11210 | 11400 | 11870 | 12000 | 12180 | 12530 |
| FLEXURAL MODULUS (kpsi) | 302 | 303 | 317 | 315 | 313 | 308 |
| NOTCHED IZOD IMPACT (⅛") | | | | | | |
| AT 73° F. (ft. lb/in) | 14.7 | 13.83 | 13.3 | 11.1 | 9.7 | 8.5 |
| AT 40° F. (ft. lb/in) | 3.2 | 1.2 | 8.41 | 1.7 | 3.5 | 3.9 |
| GARDNER IMPACT (⅛") | | | | | | |
| AT 73° F. (in. lb) | >320 | >320 | >320 | >320 | >320 | >320 |
| AT −40° F. (in. lb) | 167 | >320 | >320 | 316 | >320 | 100 |
| HEAT DEFLECTION TEMPERATURE AT 264 psi (°C.) | 76.5 | 73 | 82 | 89 | 93 | 94.5 |

*Control Formulation

TABLE VIII

| | 1 |
|---|---|
| PBT (wt. %) | 45 |
| COMPATABILIZATION AGENT (PARALOID) | EXL-3607 |
| COMPATABILIZATION AGENT (wt. %) | 7.5 |
| POLYCARBONATE (wt. %) | 40 |
| POLYCARBONATE COMPATIBILIZATION AGENT (PARALOID) | EXL-3647 |
| POLYCARBONATE COMPATIBILIZATION AGENT (wt. %) | 7.5 |
| PROPERTIES: | |
| TENSILE STRENGTH (psi) | 6120 |
| ELONGATION TO YIELD (%) | 8.4 |
| ELONGATION TO BREAK (%) | 344 |
| FLEXURAL STRENGTH (psi) | 9885 |
| FLEXURAL MODULUS (kpsi) | 285 |
| NOTCHED IZOD IMPACT (⅛") | |
| AT 73° F. (ft. lb/in) | 2.4 |
| AT 40° F. (ft. lb/in) | 1.9 |
| GARDNER IMPACT (⅛") | |
| AT 73° F. (in. lb) | >320 |
| AT −40° F. (in. lb) | >320 |
| HEAT DEFLECTION TEMPERATURE AT 264 psi (°C.) | 58 |

While in accordance with the Patent Statutes, the best mode and preferred embodiment has been set forth, the scope of the invention is not limited thereto, but rather by the scope of the attached claims.

What is claimed is:

1. A compatible thermoplastic composition, comprising:

a compatible polyester/polycarbonate alloy comprising, approximately 100 total parts by weight of a polyester and a polycarbonate containing from about 10 to about 90 parts by weight of said polyester and from about 10 to about 90 parts by weight of said polycarbonate, an effective amount of a polyester compatibilization agent which is compatible with said polyester, and an effective amount of a polycarbonate compatibilization agent which is compatible with said polycarbonate, and said polycarbonate compatibilizing agent being compatible with said polyester compatibilization agent;

said effective amount of each said compatibilization agent being sufficient to limit phase separation in said alloy such that no phase separation can be detected between said compatible polyester, said polycarbonate, said polyester compatibilization agent, and said polycarbonate compatibilization agent utilizing TEM electron micrographs at 10,000 times magnification;

wherein said polycarbonate compatibilization agent is a multiphase polymer system containing one or more elastomer phases and at least one thermoplastic phase wherein said one or more elastomer phases are made from various alkyl acrylates or one or more conjugated dienes having from 4 to 16 carbon atoms, wherein when said elastomer phase or phases are made from conjugated dienes said polycarbonate compatibilization agent contains an effective amount of either an aliphatic thioester or, a compound of the formula

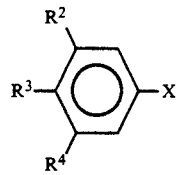

or combinations thereof, wherein $R^3$ is an alkyl group having 1 to 18 carbon atoms, $R^2$ and $R^4$ independently are linear, branched, or cyclic alkyl groups containing from 4 to 16 carbon atoms, and X is OH,

or

wherein said polyester compatibilization agent is a multiphase polymer system containing one or more elastomer phases made from one or more conjugated dienes, having from 4 to 12 carbon atoms, at least one thermoplastic phase, wherein said thermoplastic phase of said polyester compatibilization agent is free from said aliphatic thioester and said compound of formula

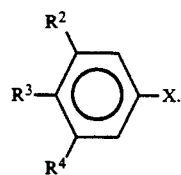

2. A compatible thermoplastic composition according to claim 1, wherein the alkyl of said alkyl acrylate in the elastomer phase of the polycarbonate compatibilization agent is from 1 to 12 carbon atoms and said at least one thermoplastic phase of said polycarbonate compatibilization agent is made from one or more monoethylenically unsaturated monomers, wherein the amount of the elastomer phase of said polycarbonate compatibilization agent is from about 40 to about 99 percent by weight and wherein the amount of the at least another remaining phase is from about 1 to about 60 percent by weight based upon a total weight of said polycarbonate compatibilization agent, wherein said polyester compatibilization agent has an elastomer phase of at least 40 percent by weight and wherein the amount of said one or more remaining phases is up to 60 percent by weight based upon the total weight of said polyester compatibilization agent.

3. A compatible thermoplastic composition according to claim 2, wherein said effective amount of said polycarbonate compatibilization agent is from about 2.5 parts to about 40 parts by weight per 100 parts by weight of said polycarbonate, wherein said effective amount of said polyester compatibilization agent is from about 5 parts to about 40 parts by weight per 100 parts by weight of said polyester;

wherein said at least one thermoplastic phase of said polycarbonate compatibilization agent is made from a vinyl substituted aromatic monomer having from about 8 to about 20 carbon atoms or an alkyl methacrylate or cycloalkyl methacrylate monomer wherein the alkyl portion has from 1 to 15 carbon atoms or a vinyl cyanide having a total of from 2 to 8 carbon atoms, and optionally a comonomer of an alkyl or an aryl methacrylate, an alkyl or an aryl acrylate, an alkyl or aryl acrylamide, a substituted alkyl or aryl methacrylate, or a substituted acrylate wherein said substituent in a halogen, an alkoxy, an aklylthio, a cyanoalkyl, an amino, or an alkylthio ester, or optionally a comonomer of a vinyl ester, a vinyl ether, a vinyl amide, a vinyl ketone, a vinyl halide, or a vinylidene halide;

wherein said at least one thermoplastic phase of said polyester compatibilization agent is made from at least one of vinyl substituted aromatic monomers having from 8 to 20 carbon atoms, an alkyl methacrylate monomer wherein said alkyl group has from 1 to 18 carbon atoms, or a methacrylic acid ester with a multifunctional alcohol having a total of up to 15 carbon atoms.

4. A compatible thermoplastic composition according to claim 3, wherein the amount of said polyester in said alloy is from about 15 parts to about 70 parts by weight and has an I.V. of from about 0.4 to about 1.1, wherein the amount of said polycarbonate is from about 30 parts to about 85 parts by weight, wherein said polycarbonate has a weight average molecular weight of from about 15,000 to about 100,000, wherein said elastomer portion of said polycarbonate compatibilization agent is made from an alkyl acrylate wherein said alkyl has from 1 to 8 carbon atoms, wherein said alkyl or a cycloalkyl methacrylate has from 1 to 12 carbon atoms, wherein said elastomer phase of said polycarbonate compatibilization agent exists in an amount of from about 50 to about 90 percent by weight and wherein said one or more remaining polycarbonate compatibilization agent remaining phases exists in an amount of from about 10 to about 50 percent by weight based upon the total weight of said polycarbonate compatibilization agent;

and wherein said polycarbonate compatibilization agent contains

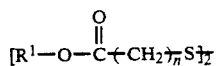

FORMULA I wherein $R^1$ is an alkyl having from 1 to about 40 carbon atoms, and wherein n is from 1 to 6, or

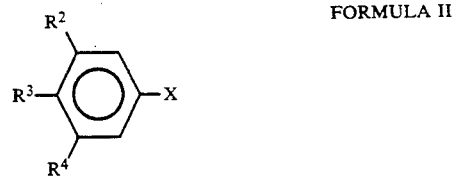

FORMULA II wherein $R^3$ is an alkyl group having from 1 to 18 carbon atoms, wherein $R^2$ and $R^4$, independently, is an alkyl having from 4 to 16 carbon atoms, and wherein X is OH,

or

5. A compatible thermoplastic composition according to claim 4, wherein said polycarbonate is a homopolymer having a weight average molecular weight of from about 20,000 to about 50,000;

wherein the amount of said polyester compatibilization agent is from about 10 parts to about 25 parts by weight per 100 parts by weight of said polyester;

wherein the amount of said polycarbonate compatibilization agent is from about 5 parts to about 25 parts by weight per 100 parts by weight of said polycarbonate;

wherein the amount of said elastomer phase of said polyester compatibilization agent is from about 50 percent to about 90 percent by weight and wherein the amount of said one or more remaining phases made from a vinyl monomer is from about 10 percent to about 50 percent by weight based upon a total weight of said polyester compatibilization agent.

6. A compatible thermoplastic composition according to claim 5, wherein said polyester is polyethyleneterephthalate, wherein the amount of said elastomer phase of said polyester compatibilization agent is from about 65 percent to about 85 percent by weight and wherein said one or more remaining phases made from a vinyl monomer is from about 15 percent to about 35 percent by weight based upon a total weight of said polyester compatibilization agent, wherein said elastomer phase of said polyester compatibilization agent is made from butadiene and wherein said polyester compatibilization agent contains two remaining phases, one of said remaining phases being made from methyl methacrylate or ethyl methacrylate, and wherein said second remaining phase is made from styrene, and wherein said polycarbonate compatibilization agent contains distearyl thio dipropionate or ditertiary butyl hydroxy toluene.

7. A compatible thermoplastic composition according to claim 6, wherein the amount of said polycarbonate is from about 40 parts to about 70 parts by weight, wherein the amount of said polyester is from about 30 parts to about 60 parts by weight, wherein said elastomer phase of said polycarbonate compatibilization agent is made form ethyl acrylate or n-butyl acrylate, and wherein said polycarbonate compatibilization agent includes one remaining thermoplastic phase made from methyl methacrylate or ethyl methacrylate, and wherein the amount of said elastomer phase of said polycarbonate compatibilization agent exists in an amount of from about 55 to about 80 percent by weight, and wherein said remaining thermoplastic phase exists in an amount of from about 20 percent to about 45 percent by weight based upon 100 percent by weight of said polycarbonate compatibilization agent.

8. A compatible thermoplastic composition according to claim 1, including up to 60 parts by weight of a reinforcing fiber per 100 parts by weight of said polycarbonate and said polyester.

9. A compatible thermoplastic composition according to claim 4, including up to 60 parts by weight of a reinforcing fiber per 100 parts by weight of said polycarbonate and said polyester, and wherein said reinforcing fiber is glass, carbon, graphite, aromatic nylon, stainless steel, boron, or combinations thereof.

10. A compatible thermoplastic composition according to claim 7, including up to 50 parts by weight of fiberglass as a reinforcing agent for every 100 parts by weight of said PET and said polycarbonate.

11. A compatible thermoplastic composition according to claim 1, wherein said polyester-polycarbonate alloy is a homogeneous blend.

12. A compatible thermoplastic composition according to claim 5, wherein said polyester-polycarbonate alloy has no apparent transmission electron microscopy phase separation at 25,000 magnification.

13. A compatible thermoplastic composition according to claim 7, wherein said polyester-polycarbonate alloy has no apparent transmission electron microscopy phase separation at 25,000 magnification.

14. A compatible thermoplastic composition according to claim 1, wherein said polymer alloy has a notched Izod impact strength of at least 7 ft.-lbs./inch.

15. A compatible thermoplastic composition according to claim 3, wherein said polymer alloy has a notched Izod impact strength of at least 7 ft.-lbs./inch.

16. A compatible thermoplastic composition according to claim 7, wherein said polymer alloy has a notched Izod impact strength of at least 7 ft.-lbs./inch.

17. A compatible thermoplastic composition according to claim 1, wherein said polymer alloy has a notched Izod impact strength of at least 14 ft.-lbs./inch.

18. A compatible thermoplastic composition according to claim 4, wherein said polymer alloy has a notched Izod impact strength of at least 14 ft.-lbs./inch.

19. A compatible thermoplastic composition according to claim 6, wherein said polymer alloy has a notched Izod impact strength of at least 14 ft.-lbs./inch.

20. A compatible thermoplastic composition according to claim 1, including up to about 55 parts by weight of a non-compatible alloy polyester per 100 total parts by weight of said polyester, said non-compatible alloy polyester, and said polycarbonate.

21. A compatible thermoplastic composition according to claim 3, including up to 55 parts by weight of a non-compatible alloy polybutylene terephthalate per 100 total parts by weight of said polyester, said polybutylene terephthalate, and said polycarbonate.

22. A compatible thermoplastic composition according to claim 7, including up to 55 parts by weight of a non-compatible alloy polybutylene terephthalate per 100 total parts by weight of said polyester, said polybutylene terephthalate, and said polycarbonate.

23. A compatible thermoplastic composition according to claim 9, including up to 35 parts by weight of a non-compatible polybutylene terephthalate per 100 total parts by weight of said polyester, said polybutylene terephthalate, and said polycarbonate.

24. A compatible thermoplastic composition according to claim 15, including up to 35 parts by weight of a non-compatible polybutylene terephthalate per 100 total parts by weight of said polyester, said polybutylene terephthalate, and said polycarbonate.

25. A compatible thermoplastic composition according to claim 19, including up to 35 parts by weight of a non-compatible polybutylene terephthalate per 100 total parts by weight of said polyester, said polybutylene terephthalate, and said polycarbonate.

26. A high impact polyester-polycarbonate composition, comprising:

a compatible polyester-polycarbonate alloy comprising approximately 100 total parts by weight of a polyester and a polycarbonate containing from about 10 to about 90 parts by weight of said polyester and from about 10 to about 90 parts by weight of said polycarbonate, an effective amount of a polyester compatibilization agent which is compatible with said polyester, an effective amount of a polycarbonate compatibilization agent which is compatible with said polycarbonate, said polycarbonate compatibilization agent being compatible with said polyester compatibilization agent, wherein said polycarbonate compatibilization agent is a multiphase polymer system containing one or more elastomer phases made from an alkyl acrylate wherein the alkyl is from 1 to 12 carbon atoms, or from one or more conjugated dienes having from 4 to 16 carbon atoms and at least one thermoplastic phase made from one or more ethylenically unsaturated monomers; wherein when said one or more elastomers are made from conjugated dienes said polycarbonate compatibilization agent contains an effective amount either an aliphatic thioester, a compound of the formula

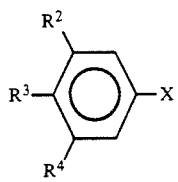

or combinations thereof, wherein $R^3$ is an alkyl group having 1 to 18 carbon atoms, $R^2$ and $R^4$ independently are linear, branched, or cyclic alkyl groups containing from 4 to 16 carbon atoms, and X is OH,

or

wherein said polyester compatibilization agent is a multiphase polymer system containing one or more elastomer phases made from one or more conjugated dienes having from 4 to 12 carbon atoms, and at least one other phase, wherein said other phase of said polyester compatibilization agent is free from said aliphatic thioester and said compound of formula

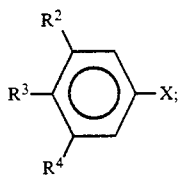

wherein the amount of the elastomer phase of said polycarbonate compatibilization agent is from about 40 to about 99 percent by weight and wherein the amount of the at least another remaining phase is from about 1 to about 60 percent by weight based upon a total weight of said polycarbonate compatibilization agent, wherein the amount of said elastomer phase of said polyester compatibilization agent is at least 40 percent by weight and wherein the amount of said one or more remaining phases is up to 60 percent by weight based upon the total weight of said polyester compatibilization agent, said compatible polyester-polycarbonate alloy having a notched Izod impact strength of 14 ft.-lbs./inch or greater.

27. A high impact polyester-polycarbonate composition according to claim 26, wherein said effective amount of said polycarbonate compatibilization agent is from about 2.5 parts to about 40 parts by weight per 100 parts by weight of said polycarbonate, wherein said effective amount of said polyester compatibilization agent is from about 5 parts to about 40 parts by weight per 100 parts by weight of said polyester, and wherein said one or more polyester compatibilization agent phases made from said vinyl monomer is a vinyl substituted aromatic having from 8 to 12 carbon atoms, an alkyl methacrylate wherein said alkyl has from 1 to 18 carbon atoms, or a vinyl cyanide compound or a derivative thereof having a total of up to 10 carbon atoms, or a methacrylic acid ester of a multi-functional alcohol having a total of up to 15 carbon atoms, wherein the amount of said polyester in said alloy is from about 15 parts to about 70 parts by weight and has an I.V. of from about 0.4 to about 1.1, wherein the amount of said polycarbonate is from about 30 parts to about 85 parts by weight, wherein said polycarbonate has a weight average molecular weight of from about 15,000 to about 100,000, wherein said elastomer portion of said polycarbonate compatibilization agent is made from an alkyl acrylate wherein said alkyl has from to 8 carbon atoms, and wherein said one or more thermoplastic phases of said polycarbonate compatibilization agent is made from an alkyl or a cycloalkyl methacrylate wherein said alkyl or cycloalkyl has from 1 to 12 carbon atoms, or a vinyl substituted aromatic having from 8 to 20 carbon atoms, or a vinyl cyanide having a total of from 2 to 8 carbon atoms, wherein said elastomer phase of said polycarbonate compatibilization agent exists in an amount of from about 50 to about 90 percent by weight and wherein said one or more remaining polycarbonate compatibilization agent remaining phases exists in an amount of from about 10 to about 50 percent by weight based upon the total weight of said polycarbonate compatibilization agent;

and wherein said polycarbonate compatibilization agents contains

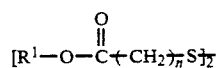

FORMULA I wherein $R^1$ is an alkyl having from 1 to about 40 carbon atoms, and wherein n is from 1 to 6, or

wherein $R^3$ is an alkyl group having from 1 to 18 carbon atoms, wherein $R^2$ and $R^4$, independently, is an alkyl having from 4 to 16 carbon atoms, and wherein X is OH,

or

28. A high impact polyester-polycarbonate composition according to claim 27, wherein said polycarbonate is a homopolymer having a weight average molecular weight of from about 20,000 to about 50,000;

wherein the amount of said polyester compatibilization agent is from about 10 parts to about 25 parts by weight per 100 parts by weight of said polyester;

wherein the amount of said polycarbonate compatibilization agent is from about 5 parts to about 25 parts by weight per 100 parts by weight of said polycarbonate;

wherein the amount of said elastomer phase of said polyester compatibilization agent is from about 50 percent to about 90 percent by weight and wherein the amount of said one or more remaining phases made from a vinyl monomer is from about 10 percent to about 50 percent by weight based upon a total weight of said polyester compatibilization agent, wherein said polyester is polyethyleneterephthalate, wherein the amount of said elastomer phase of said polyester compatibilization agent is from about 65 percent to about 85 percent by weight and wherein said one or more remaining phases made from a vinyl monomer is from about 15 percent to about 35 percent by weight based upon a total weight of said polyester compatibilization agent, wherein said elastomer phase of said polyester compatibilization agent is made from butadiene and wherein said polyester compatibilization agent contains two remaining phases, one of said remaining phases being made from methyl methacrylate or ethyl methacrylate, and wherein said second remaining phase is made from styrene, and wherein said polycarbonate compatibilization agents contains distearyl thio dipropionate or ditertiary butyl hydroxy toluene, and wherein said notched Izod impact strength is at least 14 pounds per square inch.

29. A high impact polyester-polycarbonate composition according to claim 28, wherein the amount of said polycarbonate is from about 40 parts to about 70 parts by weight, wherein the amount of said polyester is from about 30 parts to about 60 parts by weight, wherein said elastomer phase of said polycarbonate compatibilization agent is made form ethyl acrylate or n-butyl acrylate, and wherein said polycarbonate compatibilization agent includes one remaining thermoplastic phase made from methyl methacrylate or ethyl methacrylate, and wherein the amount of said elastomer phase of said polycarbonate compatibilization agent exists in an amount of from about 55 to about 80 percent by weight, and wherein said remaining thermoplastic phase exists in an amount of from about 20 percent to about 45 percent by weight based upon 100 percent by weight of said polycarbonate compatibilization agent, and wherein said notched Izod impact strength is at least 20 pounds per square inch.

30. A high impact polyester-polycarbonate composition according to claim 26, including up to 60 parts by weight of a reinforcing fiber per 100 parts by weight of said polycarbonate and said polyester.

31. A high impact polyester-polycarbonate composition according to claim 27, including up to 60 parts by weight of a reinforcing fiber per 100 parts by weight of said polycarbonate and said polyester, and wherein said reinforcing fiber is glass, carbon, graphite, aromatic nylon, stainless steel, boron, or combinations thereof.

32. A high impact polyester-polycarbonate composition according to claim 28, including up to 60 parts by weight of a reinforcing fiber per 100 parts by weight of said polycarbonate and said polyester, and wherein said reinforcing fiber is glass, carbon, graphite, aromatic nylon, stainless steel, boron, or combinations thereof.

33. A high impact polyester-polycarbonate composition according to claim 29, including up to 50 parts by weight of fiberglass as a reinforcing agent for every 100 parts by weight of said PET and said polycarbonate.

* * * * *